Jan. 12, 1971  W. N. CARSON, JR  3,554,804
SEALED RECHARGEABLE BATTERY HAVING A SENSING ELECTRODE
Filed Aug. 22, 1968
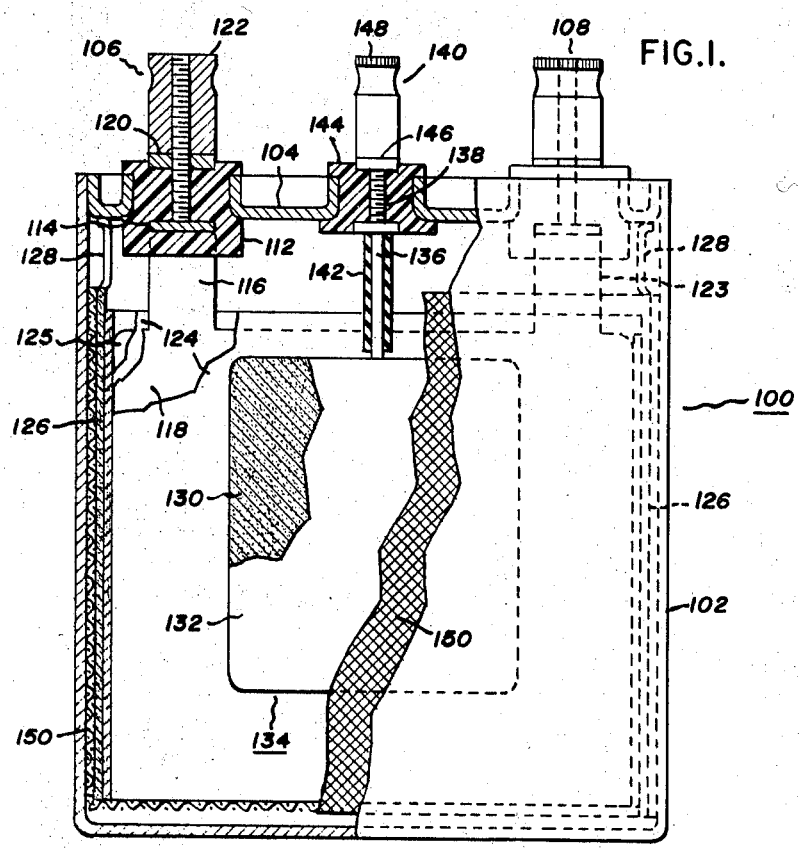
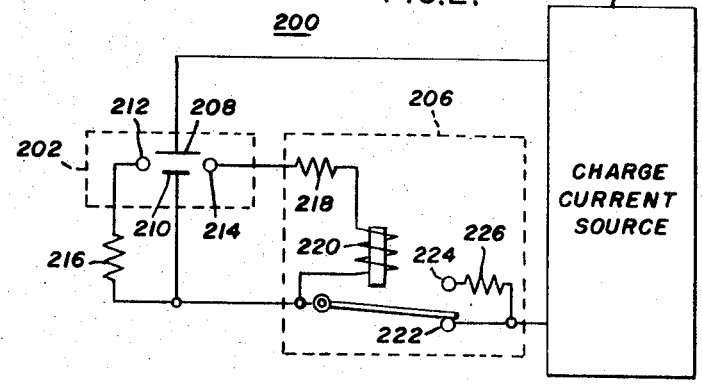
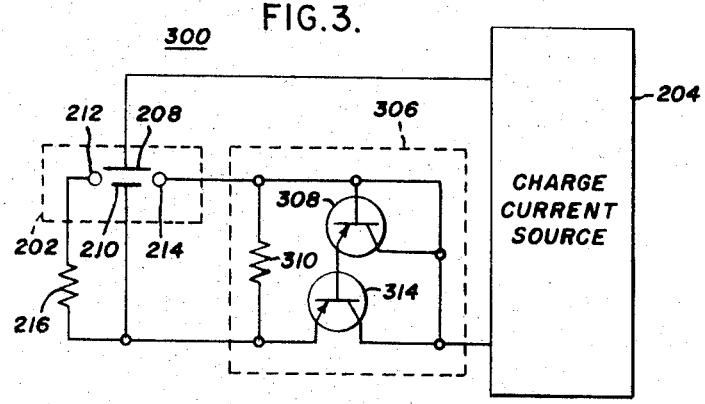
INVENTOR:
WILLIAM N. CARSON, JR
BY
HIS ATTORNEY.

United States Patent Office 3,554,804
Patented Jan. 12, 1971

3,554,804
SEALED RECHARGEABLE BATTERY HAVING A SENSING ELECTRODE
William N. Carson, Jr., Schenectady, N.Y., assignor to General Electric Company, a corporation of New York
Filed Aug. 22, 1968, Ser. No. 754,576
Int. Cl. H01m 35/00, 1/06
U.S. Cl. 136—3            4 Claims

ABSTRACT OF THE DISCLOSURE

An improved sealed rechargeable cell unit is provided having a sensing electrode which delivers an electrical signal quantitatively indicative of oxygen partial pressure within the cell. The signal can then be connected to suitable current monitoring means which can include a charge rate controller to control the rate of charging to inhibit excessive evolution of gas within the cell.

---

My invention relates to a novel sealed cell unit capable of rapid charge and to a novel charging arrangement.

The invention described herein was made in the performance of work under a NASA contract and is subject to the provisions of section 305 of the National Aeronautics and Space Act of 1958, Public Law 85–568 (72 Stat. 435; 42 U.S.C. 2457).

In the construction of sealed rechargeable cell units it is conventional practice to form the cells with the positive electrode either precharged or of reduced capacity with respect to the negative electrode so that the positive electrode approaches full charge prior to the negative electrode. Upon nearing full charge the positive electrode evolves oxygen gas. If the charge rate is not too high, the negative electrode will consume the oxygen gas as quickly as it is formed and in the process of consumption be proportionately discharged. Thus, a sealed cell unit may be charged indefinitely at a low charge rate without excessive internal pressurization, since the oxygen gas evolved by the positive electrode is continuously consumed by the negative electrode and in the process the negative electrode is maintained below full charge so that no hydrogen gas is evolved.

The desirability of having sealed cell units that can be more rapidly charged without internal pressure build up has been long appreciated. One approach to increasing charge rates has been to incorporate an oxygen recombination electrode in a sealed cell unit so that as oxygen is evolved by the positive electrode it can be more rapidly consumed. The recombination electrode is typically electrically connected to the negative electrode so that the latter in acting as a counter electrode is maintained at less than full charge.

While recombination electrodes consume oxygen faster than negative electrodes, the tendency of recombination electrodes to saturate at relatively low oxygen partial pressures has limited maximum charge rates safely obtainable. For example, typically a sealed cell unit containing a recombination electrode is initially charged at a rapid charge rate until the current between the recombination and negative electrodes reaches a predetermined level, at which time charging is either terminated or dropped to a low level. The disadvantage is that the current flowing between the recombination and negative electrodes approaches a maximum while the cell internal pressure is still at a relatively low level. Accordingly, the sealed cell unit through a disproportionately large portion of the charge cycle is held to a relatively low rate. The problem of premature reversion to low charge rate is further aggravated where the sealed cell unit is being charged under conditions that tend to induce oxygen evolution of the positive electrode well in advance of full charge, such as charging at elevated temperatures.

It is an object of my invention to provide a novel sealed rechargeable cell unit capable of being safely and reliably charged at a more rapid rate.

It is another object to provide an arrangement for rapidly charging a sealed cell unit in a controlled manner.

These and other objects of my invention are accomplished in one aspect by providing a rechargeable sealed cell unit comprised of sealed housing means defining an interior chamber including insulatively spaced electronically conductive portions forming positive and negative terminal means for the sealed cell unit. Rechargeable positive and negative plate means are located within the interior chamber. Means separately electronically connect the positive and negative plate means to the positive and negative terminal means, respectively. Porous separator means electronically insulate the positive and negative plate means from contact. An electrolyte contained within the porous separator means ionically conductively communicates the positive and negative plate means. Oxygen recombination electrode means may, if desired, be provided having a major surface contacting the porous separator means in ionically conductive relation with the electrolyte and a remaining major surface exposed to a gas containing zone of the interior chamber. Sensing means are provided for generating and delivering a signal quantitatively indicative of oxygen partial pressure within the gas containing zone. The sensing means include oxygen reduction means for withdrawing gaseous oxygen from the gas containing zone having one major surface in contact with the separator means and the electrolyte and non-porous hydrophobic polymer film means adhered to a remaining major surface of the oxygen reduction means and having a major surface exposed to the gas containing zone for limiting the rate of oxygen diffusion therethrough from the gas containing zone to the oxygen reduction means as a function of oxygen partial pressure to a rate below the maximum oxygen withdrawal capability by the oxygen reduction means. By connecting the signal generated by the sensing means through suitable current monitoring means, the oxygen partial pressure within the cell can be determined and the charging rate adjusted accordingly.

My invention may be better understood by reference to the following detailed description considered in conjunction with the drawings, in which FIG. 1 is an elevation of a sealed cell unit constructed according to my teaching, with portions broken away;

FIG. 2 is a schematic diagram of a controlled rapid charging arrangement according to my invention; and FIG. 3 is a schematic diagram of a modified controlled rapid charging arrangement.

Noting FIG. 1, a sealed cell unit 100 is illustrated constructed according to my invention. The cell unit is provided with a casing 102 having a closure 104 sealingly joined thereto. Negative and positive terminal assemblies 106 and 108, respectively, are sealingly fitted to the closure. Noting terminal assembly 106, the threaded terminal post is mounted with its lower end sealed in insulative spacer 112 molded to the closure in sealing relation therewith. The terminal post is electrically connected at 114 to the current collector strips 116 of negative plates 118. A seating ring 120 is partially embedded in the upper surface of the spacer and a thumb nut 122 is removably threaded to the upper end of the terminal post. The positive terminal assembly is identical to the negative terminal assembly, but is connected to current collectors 123 of the positive plates 125. As is conventional practice, the positive and negative plates are interleaved and insulated from contact by porous separator material 124, which also surrounds the exterior periphery of the plates. The separator material is porous and holds electrolyte therein by capillarity to provide ionic conduction between the plates.

Oxygen recombination electrodes 126, if desired, are located at each end of the positive and negative plates. The recombination electrodes are mounted with one major surface in contact with the separator material (and the electrolyte contained therein) which surrounds the portion of the end portions of the positive and negative plates.

A porous oxygen reduction substrate 130 is mounted with one major surface in contact with electrolyte containing separator material overlying the face of the adjacent negative plate 118. The remaining major surface of the oxygen reduction substrate is entirely covered by a firmly adhered non-porous film 132 (a portion of the film being broken away in the figure merely to expose the substrate to view). The substrate and film together form a sensing electrode 134. A connector strip 136 electrically connects the substrate to a terminal post 138 of a sensing electrode terminal assembly 140. The connector strip is provided with an electrically insulating sleeve 142. The lower end of the sensing terminal assembly is sealingly joined to the closure and insulatively spaced therefrom by insulative spacer 144. A seat ring 146 is imbedded in the upper surface of the spacer while a thumb nut 148 is removably attached to the upper end of the terminal post 138.

From the foregoing description it is apparent that the casing, closure, and terminal assemblies sealingly cooperate to form a sealed housing for the cell unit defining an interior chamber within which the positive, negative, recombination, if desired, and sensing electrodes are contained. The portion of the interior chamber not occupied by the electrodes, the separator material, the associated electrolyte, and various connecting strips is occupied by air at the time the cell is assembled and is hereinafter referred to as the gas containing zone of the interior chamber. To allow the outer major surfaces of the recombination electrodes and the sensing electrode to be freely accessible to the gas within the housing a coarse screen 150 formed of electrically insulative material is interposed between the outer surfaces of these electrodes and the interior surface of the casing. The screen is formed with large openings to minimize any capillary attraction for the electrolyte within the separator material.

The positive and negative plates as well as the separator material may be chosen from among those conventionally employed in sealed rechargeable cell units. The electrolyte may be any conventional aqueous electrolyte, whether acid or base. For example, where the sealed cell unit is constructed with nickel or silver positive plates and cadmium or zinc negative plates the electrolyte is typically 5 to 9 N potassium or sodium hydroxide. The sealed cell unit may, alternatively, be a rechargeable lead-acid cell having lead and lead oxide plates with sulfuric acid as the electrolyte.

The oxygen recombination electrode may take the form of any conventional oxygen recombination or fuel cell electrode useful with an aqueous or ion exchange electrolyte. An efficient fuel cell electrode that may be used as an oxygen recombination electrode with or without a porous hydrophobic gas side coating is disclosed by Niedrach in Patent No. 3,297,484, issued Jan. 10, 1967 and assigned to the assignee of this application. For operation of the sealed cell unit below 0° C. it is preferred to form the recombination electrode of a porous sintered metal plaque loaded with an electrocatalyst. Such electrodes are fully disclosed by Jones in patent application Ser. No. 691,314, filed Dec. 18, 1967 and assigned to the assignee of this application, the disclosure of which is here incorporated by reference. For example, in testing sintered metal plaque recombination electrodes having a plaque porosity of 85% at a temperature of −25° C. a decline in electrode polarization of approximately 0.2 volt was noted at a current density of 100 ma./cm.$^2$ as compared with polytetrafluoroethylene-bonded electrodes containing comparable electrocatalyst loadings, although tests at ambient temperatures showed comparable performance. In the construction of sealed cell units according to my invention intended to be operated at temperatures below 0° C. it is accordingly preferred to sintered metal plaque recombination electrodes in which the plaque has a porosity in the range of from 70 to 90 percent.

My sensing electrode is of unique construction, since it is intended to operate in a manner not heretofore contemplated in the art. The substrate is preferably formed of a material such as nickel, cobalt, gold, spinel, carbon, or one of the platinum triad metals—that is, a material which is oxidatively stable in the environment of use and which exhibits some capability for oxygen reduction. The substrate is provided with openings to permit oxygen to come into contact with the electrolyte on its surface. The substrate may be of any conventional porous construction, such as sintered metal plaque, perforated plate, woven or expanded screen, etc. Since the substrate need not reduce more than minute quantities of oxygen as compared to a recombination electrode, it is not necessary or even preferred that the substrate exhibit the high specific surface areas characteristic of fuel cell and recombination electrodes. In recombination electrodes the highest practically obtainable rates of oxygen recombination are desired, and these are directly related to the available surface area of the electrocatalyst. As a consequence, in a conventional oxygen consuming electrode it is not uncommon for the electrocatalyst to have a surface area of 10 or more square meters within a square centimeter area subtended geometrically along a major face of the electrode. By contrast, I prefer to utilize substrates having surface areas approximating those calculable by reference to their geometric dimensions—i.e., I prefer to use the substrate material in a massive, non-porous form. For example, the platinum metals and gold are preferably utilized in the form of bright, massive metals, rather than the highly particulate and/or porous, typically black, forms preferred for use in fuel cell and recombination electrodes. In the case of nickel, which is somewhat less active in oxygen reduction than the platinum metals, I prefer to form the substrate as a sintered metal plaque. An unexpectedly superior substrate formed of surface oxidized nickel is disclosed by Weinstock in patent application Serial No. 754,654, filed concurrently herewith, titled Improved Sensing Electrode for Rechargeable Sealed Battery, the disclosure of which is here incorporated by reference.

As previously described, one major surface of the porous substrate is in contact with the separator material for intimate contact with the cell electrolyte. The remaining major surface is masked from the oxygen-containing zone of the interior chamber by a non-porous hydrophobic polymer film adhered thereto. Fluorocarbon polymers are preferred, since they are highly hydrophobic and at the same time allow oxygen diffusion therethrough at relatively high rates. Exemplary suitable fluorocarbon polymers include polyhexafluoropropylene, polyvinylidene fluoride, polychlorotrifluoroethylene, polytetrafluoroethylene (hereinafter, PTFE). Of the fluorocarbon polymers PTFE is preferred because of its high hydrophobicity and high oxygen permeability. The hydrophobic character of the film is desired to minimize electrolyte wetting the surface, which could otherwise result in misleadingly low sensing electrode signals, since the oxygen diffusion path to the substrate could be proportionately increased by surface electrolyte. A high permeability for oxygen is desirable for allowing the use of thicker films to achieve a given diffusion rate and thereby reducing the chances of pin holes or similar discontinuities that must be guarded against with very thin films.

The film is firmly adhered to the surface of the substrate to prevent lateral oxygen migration to the substrate along its interface with the film, as would occur if the film were merely laid against the substrate. A preferred procedure for attaching the film to the substrate is to press the film against the substrate at an elevated temperature below the sintering temperature of the polymer. For example, with PTFE films, satisfactory bonding has been obtained with pressures in the range of from 8,000 to 12,000 p.s.i. at temperatures of from 350° to 360° C. for 40 minutes. It is recognized that bonding temperatures and pressures as well as press residence times are interrelated parameters subject to considerable variation. The film is formed pore free to maintain the maximum level of oxygen diffusion to a level below the maximum capability of the substrate to reduce oxygen. Oxygen diffusion rates within the ordinary operating pressure ranges of sealed cell units, 5 to 30 p.s.i.a, are directly proportional to the area of the electrode and to the pressure differential across the film and inversely proportional to the film thickness. It is preferred that the sensing electrode film have an oxygen diffusion rate of from $10^{-10}$ to $10^{-9}$ moles/sec. for each square centimeter of sensing electrode surface and for each pound per square inch of pressure within the cell.

The utilization of my invention is described with reference to cell 100. For ease of description it is assumed that the cell 100 is initially in the discharged state and that the pressure level within the interior chamber of the cell housing approximates that exterior of the housing. A high rate charger may be connected between the positive terminal assembly 108 and the negative terminal assembly 106. The recombination electrodes 126 are noted to be electrically connected to the cell housing through connector strips 128. The recombination electrodes are then connected to the negative plates by providing an electrical connection between the housing and the negative terminal assembly, preferably through a current limiting resistance (not shown).

The sensing terminal assembly 140 is connected to the negative terminal assembly through suitable current monitoring means. In a simple form the sensing and negative terminals may be connected through an ammeter, which may be directly calibrated in p.s.i., so that the charge current can be reduced to maintain the sealed cell unit within predetermined pressure limits merely by consulating the ammeter. Automatic regulating of the charging current as an inverse function of the sensing current can, of course, be achieved by any one of a variety of conventional techniques. For example, a reed switch controlled by the current between the sensing and negative electrodes may be used to switch additional resistance into the charging circuit and thereby reduce the charging circuit.

As the sealed cell unit is charged at a high rate some quantity of oxygen may be evolved. Initially the rate of oxygen evolution is well below the saturation level of the recombination electrodes 126. Since the recombination electrodes are capable of withdrawing oxygen from the gas containing zone of the interior chamber at a faster rate than it is formed, significant pressure increase within the sealed cell unit does not initially occur. The sensing electrode concurrently reduces a comparatively small fraction of the oxygen, but without an increase in oxygen partial pressure within the interior chamber the current between the sensing and negative electrodes remains at a base level.

As the sealed cell unit approaches full charge, oxygen evolution by the positive plates 125 accelerates to the extent that the recombination electrodes can no longer consume the oxygen at a sufficient rate to avoid rise of the oxygen partial pressure within the interior chamber. The rate of oxygen diffusion through the non-porous film 132 and of oxygen reduction by the substrate 130 increase in proportion to the increase in oxygen partial pressure. The film functions to feed oxygen to the substrate at a rate below the maximum capability of the substrate for oxygen reduction. Accordingly, the current between the negative and sensing electrodes remains proportional to the internal pressure level of the sealed cell unit even at maximum operating pressure levels. This is in marked contrast to the current flowing between the negative and recombination electrodes, which reaches a maximum or saturation level at an internal pressurization well below the maximum working pressure level.

The value of the current between the sensing and negative electrodes provides a convenient check on the internal pressure of the sealed cell unit, permitting a rapid charge rate to be utilized safely until the cell reaches a working pressure level very nearly approaching the maximum permissible internal pressure level. Slow rate charging—that is, charging at a rate which causes oxygen evolution at a slower rate than oxygen can be withdrawn by the recombination electrodes—is then curtailed sharply in duration or may be eliminated completely. The oxygen recombination electrodes continue to withdraw oxygen from the gas containing zone of the interior chamber after charging is terminated, so that by the time the sealed cell unit is discharged in use, the internal pressure level is again well below its maximum permissible value allowing rapid charging to be safely repeated on successive charge-discharge cycles.

Automatic arrangements for controlling the charge rate as a function of sensing electrode current are illustrated in FIGS. 2 and 3. In FIG. 2 a circuit 200 is schematically illustrated comprised of a sealed cell unit 202, which may be identical to sealed cell unit 100, a high rate charge current source 204, and a charge rate controller 206. Within the sealed cell unit the positive electrode 208, negative electrode 210, recombination electrode 212, and sensing electrode 214 are schematically shown. The positive electrode is connected directly to the charge current source. The recombination electrode is connected to the negative electrode through a resistance 216. Sensing electrode 214 and negative electrode 210 are connected to the charge rate controller. The controller connects the sensing electrode to the negative electrode through a resistance 218 and a coil 220, which may be the coil of a reed switch. Normally closed contacts 222 of the switch connect the negative electrode to the sealed cell unit, Normally, open contacts 224 connected in series with a resistance 226 shunt the contacts 222.

In operation, a high charging current is supplied to the sealed cell unit 202 from the charge current source 204 through the normally closed contacts 222 of the charge rate controller. Throughout the major portion of charging the recombination electrode 212 maintains the pressure level within the sealed cell unit a low level. As full charge is approached the pressure within the sealed cell unit increases. This increases the current between sensing electrode 214 and negative electrode 210. When the current reaches a predetermined level corresponding to a predetermined maximum pressure level of the cell unit, coil 220 opens contacts 222 and closes contacts 224. This places resistance 226 in series with the sealed unit in the charging circuit and reduces the charging rate to a level at which oxygen is evolved slower than it is combined by the recombination electrode. The sealed cell unit then poceeds to full charge at a slow charge rate.

FIG. 3 illustrates a charging circuit 300 identical to charging circuit 200, except for the charge rate controller 306. In this circuit the sensing electrode 214 is connected to the base of a PNP transistor 308 and through a resistance 310 to the negative electrode of the sealed cell unit. The base of transistor 308 is connected to the negative terminal of the charge source. The collector of the transistor 308 is also connected to the negative terminal of the charge source. The emitter of the transistor is connected to the base of a second PNP transistor 314. The emitter of the transistor 314 is connected to the negative electrode of the sealed cell unit while the collector of the transistor 314 is connected to the negative terminal of the charge source.

In use, upon pressure increase within the sealed cell unit, a small potential develops across resistance 310 proportional to the current flowing between the sensing and negative electrodes. This potential increase causes the base of transistor 308 to become slightly more positive with respect to the emitter so that the emitter to collector current of the transistor 308 is reduced. This in turn causes the base of the transistor 314 to become more positive with respect to its emitter and controls the emitter to collector current through the transistor 314, which is the charge current for the sealed cell unit. The advantage of the charge rate controller 306 is that it is able to control the charging current in inverse proportion to the current flowing between the negative and sensing electrodes.

To illustrate the practice of my invention several nickel-cadmium sealed cell units were constructed similar to sealed cell unit 100. Each cell unit was provided with eleven negative plates, ten positive plates, woven nylon separator material, and 31 percent by weight potassium hydroxide electrolyte, as is conventional practice. The cell units were sized to yield a normal 6 ampere-hour capacity. Each cell unit incorporated two 1.5 by 5.0 centimeter recombination electrodes formed of sintered nickel plaque having a thickness of 11 mils and a porosity of 85.4 percent. The plaque was loaded with 5.00 mg./cm.$^2$ platinum black and provided with a 1.20 mg./cm.$^2$ porous surface coating of PTFE according to the technique described in the Jones patent application, noted above. The sensing electrode for each cell unit was 9.8 cm.$^2$.

The sealed cell units were tested to establish their suitability for an application requiring a 90 minute charge-discharge cycle—60 minutes on charge and 30 minutes on discharge. From the tests it was established that the sealed cell units were capable of sustaining a depth of discharge up to 75 percent during each charge-discharge cycle with cell temperatures being varied from −20° to 40° C. It was found that internal pressurization of the sealed cell units could be maintained below 30 p.s.i.a.

Comparison of PTFE bonded platinum recombination electrodes of the type disclosed by the Niedrach patent, noted above, with plaque based recombination electrodes showed comparable performance at ambient temperatures and above, but plaque based recombination electrodes were noted to be markedly superior at temperatures below 0° C., presumably due to the larger pore sizes allowing greater oxygen diffusion at these lower temperatures.

A number of different sensing electrodes were tested and found to yield current responses directly related to internal pressure levels. In most instances the current responses of the sensing electrodes yielded linear or near-linear responses. For example, sensing electrodes were constructed of 20 mil thick porous nickel plaque having 4 to 7 micron pores, and 80 percent porosity variously covered with non-porous PTFE films 1 mil, 0.5 mil, and 0.25 mil in thickness. The one mil thick films were joined to the substrate using 12,000 p.s.i.g. at 672° F. for about 45 minutes; the 0.5 mil films were joined using 8,000 p.s.i.g. at 672° F., for about 60 minutes; and the 0.25 mil films were joined using 6,000–8,000 p.s.i.g. 672° F. for about 60 minutes. Aluminum foil discs used to prevent the films from adhering to the press platen were dissolved in potassium hydroxide. It was observed that linear or near linear responses were obtainable throughout the desired operating pressure range of from 5 to 30 p.s.i.a. and a temperature range of from −10° to 35° C. The resistances between the sensing and negative terminals were varied from 10 to 200 ohms. In some cells the size of the sensing electrode was reduced to 0.86 square centimeter. Linear and near-linear responses were also noted with these reduced area sensing electrodes. Extended operation for periods of over 750 charge-discharge cycles was obtained after which cycling was terminated with the cell units still exhibiting satisfactory end of discharge potentials, that is, above 0.8 volt.

Other sensing electrode substrates employed included 5 Ni 10–3/0 screen, 100 x 100 mesh gold screen formed of 3 mil pure gold wire, 10 mil thick expanded tantalum mesh covered with 0.25 mil thick bright platinum coating and, in a varied form, with platinum on only one face. Operated within the parameter limits, noted above in connection with the nickel plaque, it was observed that in all instances a sensing electrode to negative electrode current was obtainable directly related to the internal pressure level within the sealed cell unit. Both linear and near-linear responses were obtained.

While I have described my invention with reference to a preferred embodiment, the sealed cell unit 100, it is appreciated that my invention may be practiced with any conventional rechargeable sealed cell unit having an aqueous electrolyte and is not limited to the specific cell construction described. For example, my invention may be applied to sealed cell units in which a plurality of cells are contained within a common sealed housing so that a common gas containing zone is defined. The positioning of the sensing electrode within the interior chamber may be varied as desired so long as the electrode is mounted with one major face in contact with the gas containing zone of the interior chamber. For example, in a cell construction having spiral wound plates rather than flat plates it may be desirable to locate the sensing electrode interiorly of the spiral wound plates. Either the sensing or negative electrodes may be directly attached to the cell housing. Alternately, all may be provided with separate terminals. Instead of the specific charge rate controllers described other conventional arrangements capable of limiting a first current in response to or in proportion to the increase of a second current in an equivalent manner may be substituted. Still other modifications will readily occur to others skilled in the art having knowledge of my invention. It is accordingly intended that the scope of my invention be determined by reference to the following claims.

What I claim and desire to secure by Letters Patent of the United States is:

1. A rechargeable sealed battery cell comprised of
    sealed housing means including insulatively spaced electronically conductive portions forming positive, negative and sensing terminal means for said unit,
    rechargeable positive and negative plate means within said housing means,
    means separately electronically connecting said positive and negative means to said positive and negative terminal means, respectively,
    electrolyte-containing porous separator means electronically insulating said positive and negative plate means,
    an electrolyte contained within said porous separator means ionically conductively communicating said positive and negative plate means, and
    sensing means electronically connected to the sensing terminal means and delivering a signal linearly responsive to oxygen partial pressure within the gas containing zone comprising,
    oxygen reduction means for withdrawing gaseous oxygen from a gas containing zone in said sealed housing means, said oxygen reduction means consisting of at least one metal selected from the group consisting of nickel, cobalt, gold, and the platinum triad metals, and having one major surface in contact with the electrolyte-containing separator means overlying the negative plate, and
    non-porous hydrophobic polymer film means adhered to and entirely covering a remaining major surface of said oxygen reduction means and being exposed to a gas-containing zone within said housing means.

2. A rechargeable sealed cell unit according to claim 1 in which said non-porous hydrophobic polymer film means is a fluorocarbon polymer film.

3. A rechargeable sealed cell unit according to claim 1 in which said non-porous hydrophobic polymer film means is a polytetrafluoroethylene film.

4. A rechargeable sealed cell unit according to claim 1, said housing means defining an interior chamber containing said positive and negative plate means and further containing oxygen recombination electrode means having a major surface contacting said porous separator means in ionically conductive relation with said electrolyte and a remaining major surface exposed to a gas containing zone of the interior chamber.

References Cited

UNITED STATES PATENTS

| | | | |
|---|---|---|---|
| 2,578,027 | 12/1951 | Tichenor | 320—46 |
| 2,842,607 | 7/1958 | Germershausen et al. | 136—6 |
| 2,951,106 | 8/1960 | Ruetschi | 136—6 |
| 3,005,943 | 10/1961 | Jaffe | 136—28X |
| 3,080,440 | 3/1963 | Ruetschi et al. | 136—3 |
| 3,096,215 | 7/1963 | Voss et al. | 136—6 |
| 3,276,909 | 10/1966 | Moos | 136—86 |
| 3,350,225 | 10/1967 | Seiger | 136—6 |
| 3,356,533 | 12/1967 | Carson, Jr. | 136—24X |
| 3,462,303 | 8/1969 | Reber | 136—179X |

ALLEN B. CURTIS, Primary Examiner

A. SKAPARS, Assistant Examiner

U.S. Cl. X.R.

136—6, 179, 182

UNITED STATES PATENT OFFICE
CERTIFICATE OF CORRECTION

Patent No. 3,554,804             Dated January 12, 1971

Inventor(s) William N. Carson, Jr.

It is certified that error appears in the above-identified patent and that said Letters Patent are hereby corrected as shown below:

Claim 1, line 48, after the word "negative" (first occurrence) the word "plate" has been inadvertently omitt Claim 1 was amended under Rule 121(b) in an amendment dated April 13, 1970. In this amendment the word "plate" (which was in the originally filed Claim 1) was inadvertently omitted without cancellation by bracket as required by Rule 121(b).

Signed and sealed this 6th day of July 1971.

(SEAL)
Attest:

EDWARD M. FLETCHER, JR.          WILLIAM E. SCHUYLER, JR.
Attesting Officer                 Commissioner of Patents